Dec. 23, 1930.   M. M. CODY   1,786,390
GASKET
Filed Oct. 21, 1929
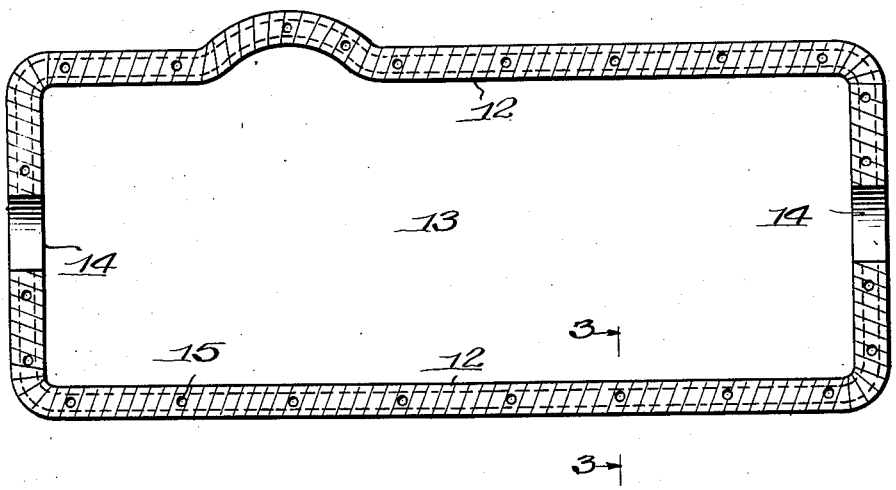
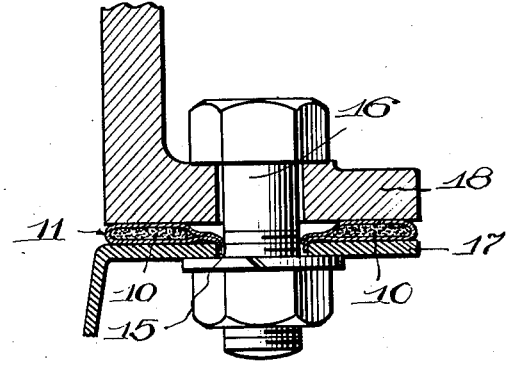
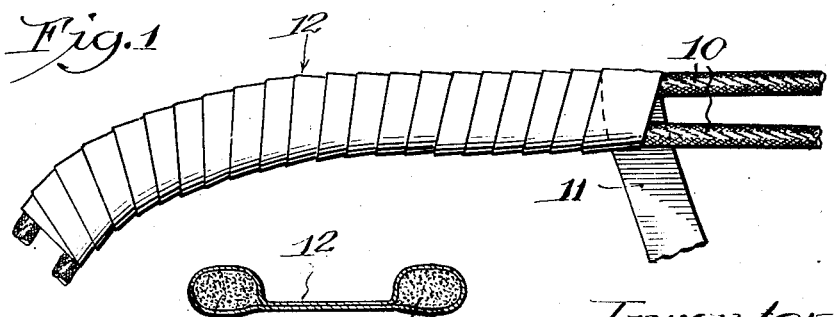
Inventor,
Martin M. Cody,
George Bayard Jones Atty.
Witness:
Chas. P. Toursh.

Patented Dec. 23, 1930

1,786,390

UNITED STATES PATENT OFFICE

MARTIN M. CODY, OF CHICAGO, ILLINOIS, ASSIGNOR TO CRANE PACKING COMPANY, A CORPORATION OF ILLINOIS

GASKET

Application filed October 21, 1929. Serial No. 401,318.

My invention relates to improvements in gaskets.

One object of the invention is to provide an improved flexible gasket which may be readily bent in any direction.

Another object is to provide a gasket of this character which will maintain an effective seal under pressure even though bent at a considerable angle and flattened or mashed when compressed between the flanges constituting the joint.

A further object is to provide a flexible gasket of thin metal foil which may be readily punctured by hand, using any pointed instrument, to provide bolt holes wherever needed after the gasket has been placed on the flange where it is to be used, whereby the necessity of punching the holes in advance at definite predetermined distances and by the use of special tools, is avoided.

An additional object is to provide a flexible metal gasket of this character which may be furnished in long lengths whereby the desired strip may be cut off and bent to fit the particular work at hand, resulting in a gasket which is universally adaptable.

Other objects and advantages will be apparent from the description hereinafter given of one embodiment of the invention.

In the accompanying drawings

Fig. 1 is a plan view of a short length of gasket, showing the manner in which the metal foil is helically wound;

Fig. 2 is a top plan view of two strips of the gasket, which have been fitted to the oil pan of an automobile;

Fig. 3 is an enlarged section of part of an oil pan showing the gasket in place; and Fig. 4 is an enlarged section of a finished gasket.

The gasket consists of two or more cords or strings 10—10, made preferably of fibrous material such as braided hemp, flax, asbestos, cotton or the like, which strings are first run through a bath to treat them with a suitable compound which will cause the individual strands or fibers to adhere to each other sufficiently to maintain an effective seal even though the cord is mashed down very thin and widened out accordingly, this widening tending to spread many of the strands or fibers.

Compounds which have been used, such as wax and graphite, asphaltum, varnish, shellac and rubber cement, have been found suitable, although various other compounds may be used, depending on the character of the service in which the gasket will be used.

The two strings are fed along in a machine in spaced parallel relation and at the same time a strip of soft metal foil 11 is wound helically about them. Aluminum or lead foil is suitable for the purpose, although any very thin flexible material, including paper, preferably in the form of a narrow strip or ribbon, may be used.

As shown in Fig. 1 the layers of the helical winding preferably overlap considerably due to the width of the foil and the angle at which it is wrapped. With different widths the foil may overlap to a greater or less extent thus making a fairly tight covering separating the cords or cores, particularly when the completed structure 12 is firmly compressed or mashed down between adjacent flanges which are bolted together.

However, it is contemplated that where the gasket is used to seal against the escape of oil or other liquids, there are cases in which the oil will leak through the overlapping helical turns, but the treatment of the cords is such that said cords provide an effective seal to prevent the escape of the liquid past the same. In view of this fact it is not essential in some cases to wrap the foil so tightly or with such a degree of overlapping as to depend on the same to provide an effective seal regardless of the beads and therefore a narrow strip of foil may be used under such conditions with the layers not overlapping at all.

After the wrapping operation, the gasket is preferably run between rollers or otherwise treated to partially flatten the beads and press the intermediate portions together, as shown more particularly in Fig. 4 in which the upper surface is pressed down against the lower surface thus confining the cords 10 at opposite sides of the gasket strip and maintaining them in place. It is immaterial whether the adjacent foil surfaces constitute the lower side of the gasket as in Fig. 4 or the upper side or whether they occupy an intermediate position in the form of a central connecting web, for example.

The gasket strip is very flexible as suggested in Fig. 1, and may readily be bent by hand at a very sharp angle. In Fig. 3, two lengths of the strip are shown applied to an automobile oil pan 13 and bent to fit the flanges thereof, terminating at the semi-circular openings 14. After the gasket strips are positioned, the necessary bolt holes 15 are punched by any suitable instrument such as a prick punch, although some metal foil is so soft that the holes may be punched even with a lead pencil. In other classes of service the gasket may be tacked or nailed to a wooden support, when used therewith, or it may be cemented in place.

In punching the metal, the marginal portions around the hole are pressed downwardly more or less into the bolt hole (see Fig. 3) thus serving to hold the gasket in place and prevent it from slipping until such time as the bolts 16 are in place and the nuts tightened, at which time the gasket flattens out. By providing a bead on opposite sides of the bolt holes there is no danger of cracking or bending the flanges 17, 18 by what would otherwise be an eccentric load, although it will be seen that in some cases where the parts are well able to withstand such eccentric load, one bead may be much larger than the other, the larger one serving as a seal and the other merely as a finishing edge to hold the flexible cord in position.

To make, in effect, a continuous gasket, the gasket strip is merely bent to a circle, oval or other outline and the ends overlapped slightly and also preferably displaced a little sideways so that the beads do not overlie each other. When compressed, a continuous seal is effected.

As suggested in Fig. 3, the cords are squeezed down very thin and widened extensively, thus tending to force the strands apart, but the previous treatment given the fibers is such as to prevent them from tearing apart and leaving openings through which liquid may leak. In other words, an effective seal is maintained, even against liquid under considerable pressure.

There are conditions where this treatment need not be employed and the untreated cords used in conjunction with the helical wrapping to provide the necessary tight joint, although the impregnation is preferred and in many cases is essential.

Although fibrous cords are shown in the preferred embodiment of the invention, it is apparent that soft metal wires or strands of metal or other suitable material, braided, woven or otherwise formed of a plurality of strands, or of a single strand, may be used under the same conditions. The soft metal or other material will flatten out more or less and provide an effective seal as in the case of a lead or copper wire, for example.

It is also apparent that the two beads may be made up of cores of different material, for example, one of cord and the other of wire, i. e. the seal may be maintained primarily by the cord and a much smaller wire used for the opposite side of the gasket merely to provide a bead at each edge to enable the foil to be wrapped in the manner described.

It is obvious of course that the gasket may be bent in any direction, either in its own plane as shown in Fig. 1, which is the most useful one under most conditions, or it may also be bent out of its plane to follow a surface which is not flat.

The materials of the gasket are such as are not readily attacked by oil for example, in the case of an automobile oil pan gasket or other fluids such as are ordinarily encountered in gasket service, nor are they readily affected by high temperatures. The material selected may also be resistant to acid or other deteriorating agents.

What I claim is:

1. A flexible gasket comprising a pair of cores of compressible material and a helical wrapping of soft metal foil about the same, said cores being spaced apart with the metal bent partially around the cores to provide a section thinner in the middle than at the ends.

2. A flexible gasket comprising a pair of flexible longitudinal members spaced apart and a covering of thin material wrapped around the same in helical form to provide a flexible strip which may be bent in its own plane, the space between said flexible members being sufficient to permit holes to be made through the walls of the covering to accommodate fastening means.

3. A flexible gasket comprising a pair of fibrous longitudinal members spaced apart and a covering of thin material wrapped around the same in helical form to provide a flexible strip which may be bent in its own plane, the space between said fibrous members being sufficient to permit holes to be made through the walls of the covering to accommodate fastening means, said members being impregnated with a material which permits the fibers to change their relative position without producing openings sufficient to permit leakage of liquid through the same.

4. A gasket comprising a pair of absorbent cords spaced apart and a helical wrapping of soft metal foil about the same, the metal foil on opposite sides of said cords being pressed together to form a thin web, said cords being impregnated with an adhesive solution.

5. A gasket strip comprising a pair of absorbent cords impregnated with a material resistant to the disintegrating action of fluids and covered with thin metal foil whereby a flexible strip is provided, said gasket having holes therein between said cords to accommodate bolts.

In testimony whereof, I have subscribed my name.

MARTIN M. CODY.